(12) United States Patent
Goodwin, III

(10) Patent No.: US 7,874,097 B2
(45) Date of Patent: Jan. 25, 2011

(54) LOBSTER TRAP WITH RING GUARD ASSEMBLY

(76) Inventor: William Hooper Goodwin, III, P.O. Box 1398, Marblehead, MS (US) 01945

( * ) Notice: Subject to any disclaimer, the term of this patent is extended or adjusted under 35 U.S.C. 154(b) by 725 days.

(21) Appl. No.: 11/755,843

(22) Filed: May 31, 2007

(65) Prior Publication Data

US 2007/0277427 A1    Dec. 6, 2007

Related U.S. Application Data

(60) Provisional application No. 60/803,789, filed on Jun. 2, 2006.

(51) Int. Cl.
 *A01M 23/06* (2006.01)
 *A01K 69/06* (2006.01)
 *A01K 61/00* (2006.01)
(52) U.S. Cl. .................. 43/65; 43/58; 119/213
(58) Field of Classification Search .................. 43/100, 43/58, 61, 64–67; 119/204, 213; 69/6, 8; *A01K 61/00, A01K 69/06, 69/08; A01M 23/08*
See application file for complete search history.

(56) References Cited

U.S. PATENT DOCUMENTS

| 4,184,283 | A | * | 1/1980 | Wyman | 43/102 |
| 4,221,070 | A | * | 9/1980 | Swindell | 43/100 |
| 4,611,424 | A | * | 9/1986 | Tarantino | 43/100 |
| 4,848,025 | A | * | 7/1989 | Wyman et al. | 43/102 |
| 4,905,405 | A | * | 3/1990 | Hendricks | 43/100 |
| 5,067,271 | A | * | 11/1991 | Henning | 43/60 |
| 5,168,653 | A | * | 12/1992 | Wyman et al. | 43/100 |
| 5,771,627 | A | * | 6/1998 | Mattson et al. | 43/100 |
| 5,924,237 | A | * | 7/1999 | Ives | 43/100 |
| 5,974,725 | A | * | 11/1999 | Knight | 43/100 |
| 6,804,911 | B1 | * | 10/2004 | Henke | 43/100 |
| 2007/0261292 | A1 | * | 11/2007 | December | 43/100 |

* cited by examiner

*Primary Examiner*—Son T Nguyen
*Assistant Examiner*—Shadi Baniani
(74) *Attorney, Agent, or Firm*—Renner, Otto, Boisselle & Sklar, LLP

(57) ABSTRACT

A lobster trap that promotes entry of lobsters into the trap while restricting lobsters from exiting the trap. Accordingly, a lobster trap comprises at least one head including an opening for entry into an interior of the trap, and a shield member mounted to the trap adjacent the opening. The shield member extends into the interior of the trap away from a plane of the opening and shields the opening from egress from the interior of the trap from at least one direction while not restricting entry to the interior of the trap. The lobster trap can further include a guard member extending from the shield so as to further restrict exit from the trap via the head.

9 Claims, 2 Drawing Sheets

LOBSTER TRAP WITH RING GUARD ASSEMBLY

RELATED APPLICATIONS

This application claims the benefit of U.S. Provisional Application No. 60/803,789 filed Jun. 2, 2006, which is hereby incorporated herein by reference.

FIELD OF THE INVENTION

The present invention relates generally to traps for trapping sea creatures, such as crustaceans. More particularly, the invention relates to a gate for an opening of a trap.

BACKGROUND OF THE INVENTION

Lobster fishing as a trade and for survival has been practiced for many years. The classic lobster trap is designed to trap a lobster by coaxing the lobster through one or more funnel shape passages. As lobsters are crawlers and not swimmers, lobster traps typically endeavor to make it easy for a lobster to crawl into the trap and difficult for the lobster to crawl out of the trap. One way in which this is done is using funnel-like nets that terminate at a ring that is suspended above a bottom surface of the trap such that after a lobster crawls through the ring and enters the trap, the lobster is not readily able to reach the ring opening to escape the trap.

With reference to FIG. 1, a typical lobster trap 2 includes a rectangular enclosure 4 divided into two main compartments, a kitchen 6 and a parlor 8. Access to the interior of the enclosure 4 is typically via one or more funnel nets 10 secured to a ring 12 through which the lobsters can crawl. The funnel net 10 and ring 12 together define a head 14. A bait bag (not shown) is placed in the kitchen 6 for attracting lobsters and other sea creatures, which may include crabs, for example. After a lobster enters the kitchen 6 and is ready to leave, the easiest path of apparent exit is via a head leading to the parlor 8. Accordingly, and in theory, a lobster first will be drawn into the kitchen 6 by the bait bag, and then exit the kitchen into the parlor 8 where it will remain until a lobsterman hauls the trap to harvest the lobsters. The typical lobster trap, therefore, functions like a maze to prevent lobsters from escaping prior to the lobsterman returning to haul the trap.

While the above described lobster trap is an effective tool for catching lobsters, a number of factors limit the efficiency of such traps. For example, it has been estimated that a large number of lobsters that initially approach the trap either do not enter the trap, or enter the trap and escape prior to the return of the lobsterman. One way in which lobsters escape is simply by crawling back through the heads of the trap in the reverse manner in which they entered. Lobsters that approach the trap and do not enter may be deterred from entering by lobsters already in the trap that make entry difficult (e.g., by blocking the heads). Still other lobsters are deterred from entering the trap because lobsters already in the kitchen may become aggressive and defend the bait bag.

Further reduction in fishing efficiencies may be due to regulations imposed by state and federal agencies. Typically, regulations govern both the number of traps fished, and specific size range of lobsters which may be harvested. Accordingly, certain specific size openings or escape vents are often required to be used on lobster traps. Such regulations are designed to allow smaller size lobsters that are not within a specified range, sometimes referred to as shorts, to escape a trap. Larger lobsters, however, may be less likely to enter the trap.

Other governmental regulations, though not directly related to lobsters, can increase the cost of lobster traps by making the traps less efficient and/or increasing the likelihood of losing a trap on the ocean floor. For example, regulations aimed at protecting the right whale require breakaway buoys and/or lineless traps to reduce the impact of lobster fishing on right whales. Regardless of the intended purpose of the regulations, the typical result for lobstermen is higher costs and/or lost profits.

SUMMARY OF THE INVENTION

A lobster trap that promotes entry of lobsters into the trap while restricting legal size lobsters from exiting the trap. Accordingly, a lobster trap comprises at least one head including an opening for entry into an interior of the trap, and a shield member mounted to the trap adjacent the opening. The shield member extends into the interior of the trap away from a plane of the opening and shields the opening from egress from the interior of the trap from at least one direction while not restricting entry to the interior of the trap. The lobster trap can further include a guard member extending from the shield so as to further restrict exit from the trap via the head.

In an exemplary embodiment, a lobster trap comprises at least one head including an opening through which lobsters enter the trap, and a shield member mounted to the trap adjacent the opening. A guard member extends from a distal end of the shield member, the guard member movable between a closed position at least partially obstructing the opening and an open position. The shield member is positioned adjacent the opening at an upper side thereof, and the guard member extends from the distal end of the shield member to a lower portion of the opening. In an exemplary embodiment, the guard member is substantially vertical when in the closed position. The shield member can be mounted to a ring defining the opening in the head.

In accordance with another aspect of the invention, a gate assembly for an opening of a lobster trap comprises a shield member mountable to the lobster trap such that it extends into the interior of the trap away from a plane of the opening and shields the opening from egress from the interior of the trap from at least one direction while not restricting entry to the interior of the trap, and a guard member extending from the shield member and movable between a closed position at least partially obstructing the opening and an open position.

In accordance with a further aspect of the invention, a shield mountable to a lobster trap includes a mount portion for mounting the shield, and a shield portion, wherein the shield portion is generally planer for shielding an opening of the lobster trap from at least one direction when mounted thereto.

Further features of the invention will become apparent from the following detailed description when considered in conjunction with the drawings.

DETAILED DESCRIPTION

Figure 1:
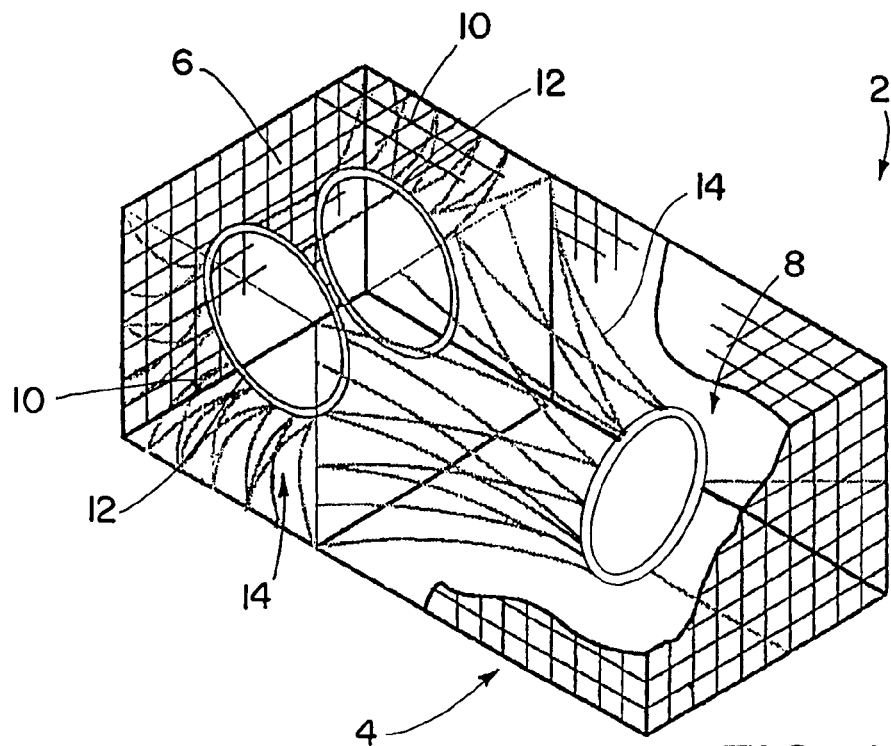
FIG. 1 is a perspective view of a typical lobster trap.
Figure 2:
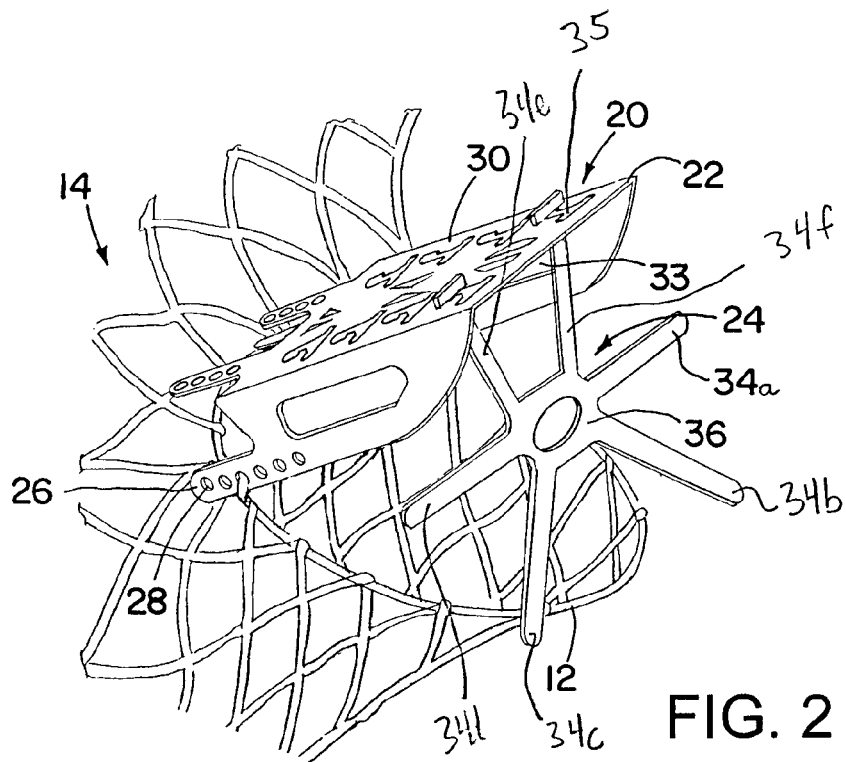
FIG. 2 is a perspective view of an exemplary head of a lobster trap including a shield member and a guard member in accordance with the invention.

Referring now to drawings 2-4 in detail, and initially to FIG. 2, a lobster trap head 14 as described above is illustrated including an exemplary gate assembly 20 in accordance with an embodiment of the invention. Although the head 14 in FIG. 2 is angled upwardly, it will be appreciated that the following description is applicable to heads having other orientations, such as the vertically oriented head 14 in FIG. 1. The guard assembly 20 includes a shield member 22 and a guard member 24, also referred to herein as a ring guard and/or gate, extending downward from the shield member 22 and partially obstructing the opening of the ring 12. The shield member 22 is attached to the head 14 at a position above the opening defined by ring 12. As illustrated the shield member 22 is attached at a first end to the ring 12. The shield member 22 can be fastened to the ring 12 with suitable fasteners such as twine, zip-type fasteners, or hog rings, for example. It will be appreciated that the shield member 22 can also be attached to the netting of the lobster trap adjacent the ring 12, as desired.

The shield member 22 includes an attachment tab 26 (mount portion) on each side thereof having a plurality of spaced apart holes 28 for securing the shield member 22 to the ring 12. The holes 28 allow attachment of the shield member 22 in a plurality of positions thereby facilitating adjustment of the positioning of the shield member 22 during installation. Additional tabs and/or notches can be provided for attaching and/or positioning the shield member 22 with respect to the ring 12 and/or net. Such tabs and/or notches can be configured to interlock with the ring 12 so as to secure the shield member 22 thereto.

The shield member 22 includes a central portion 30 and downwardly turned edge flap portions 32 that together form a shield portion of the shield member 22. The edge flap portions 32 tend to follow the shape of the upper portion of the ring 12. It will be appreciated that other shapes are possible such as a curved shield that corresponds to the shape of the ring 12, for example. In addition, the shield member 22 can include additional side flap portions for obstructing and/or shield the opening in the head 14 to prevent lobsters from exiting the trap by navigating through the space between the shield member 22, guard member 24, and ring 12. In this regard, additional ring guard-like members and/or individual spoke-like members (as described below) can be attached to the shield member 22 for further obstruction of the opening of the trap. The shield member 22 can include one or more openings 33 for allowing water to pass through the shield member 22 and for securing the guard member 24 thereto.

Figure 3:
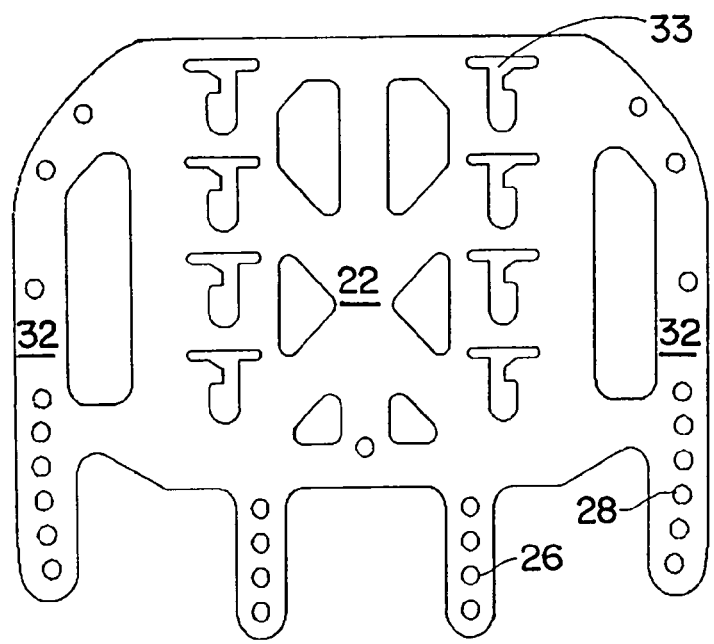
FIG. 3 is a plan view of an exemplary shield member in accordance with the invention.

The guard member 24 has a plurality of spokes 34a-34f (protrusions) or fingers extending from a central hub portion 36. The upper spokes 34e and 34f are hingedly attached to the shield member 22 such that the guard member 24 is movable between a closed position at least partially obstructing the opening of the trap as shown, to an open position (not shown) whereat the guard member 24 is pivoted away from the opening of the trap. The guard member 24 can be attached in any suitable manner, such as by hinge mechanisms. Alternatively, and as illustrated, spokes 34e and 34f have a T-shape end that is inserted into a key slot 35 thereby securing the guard member 24 to the shield member 22. In this regard, a plurality of key slots 35 can be provided in the shield member 22 to allow adjustment of the position of the guard member 24 (see FIG. 3) so as to properly position the guard member 24 relative to the opening. Alternatively, spokes 34e and 34f can be resilient and/or flexible so as to be bendable to allow deflection of the guard member 24 between the closed position and the open position. In such case, spokes 34e and 34f could be rigidly secured to the shield member 22.

The spokes 34a-34f can be spaced apart a prescribed amount so as to allow undersized lobsters to pass therebetween and escape the trap. In this regard, the spokes 34a-34f can be shaped and/or positioned to accommodate the passage of undersized lobsters. For example, the space between spokes 34b and 34c can correspond to a space large enough to permit the largest undersized lobsters to escape the trap, while preventing legal size lobsters from passing therethrough.

One or more of the spokes 34a-34f can also be curved and/or extend from the hub 36 at an angle so as to more closely approach and/or engage the ring 12 when the guard is in the closed position. For example, spokes 34a and 34d can be bent or otherwise extend from hub 36 towards the ring 12 so as to more completely obstruct the opening defined by the ring 12. In this regard, spokes 34a and 34d can be slightly longer than other unbent spokes to accommodate such a bend.

The guard member 24 can have any suitable shape, such as a triangular shape, for example. A portion of the guard member 24 will typically extend downward from the shield member 22 to a position at or below a lower portion of the ring 12. The guard member 24, therefore, will generally be prevented from being pushed into the opening of the ring 12 by interference with the lower portion of the ring 12. Accordingly, the guard member 24 functions as a one-way gate, permitting entry of lobsters into the trap while preventing legal size lobsters from escaping the trap.

The illustrated shield member 22 is secured to the ring 12 such that the shield member 22 extends into the interior of the trap at an upward angle. The guard member 24, being hingedly attached to the shield member 22, thus tends to hang substantially vertically from the shield member 22. The guard member 24 can be weighted at its lower end to facilitate remaining in the closed position as illustrated. Alternatively, the guard member 24 can be made of a neutral buoyancy material such that the guard member 24 will generally remain in its closed position, but can be easily pivoted to the open position by a lobster upon entry.

The guard assembly 20 generally functions to permit entry of lobsters into the trap while preventing exit of lobsters from the trap. By maintaining the guard member 24 substantially vertical when in the closed position, the guard assembly 20 prevents and/or reduces the likelihood that a lobster or other sea creatures already in the trap may pin the guard member 24 in the closed position, as may be the case if the guard member merely rested across the opening of the ring (e.g., without the shield member providing a location to mount the guard member vertically). Accordingly, aspects of the invention are particularly well suited for use on heads have openings and/or rings that are not vertical (for example, as shown in FIG. 2).

As such, the shield member 22 operates to restrict lobsters and other sea creatures in the trap from interfering with the operation of the guard member 24 (e.g., laying on top of the gate and/or attempting to escape). Accordingly, it is believed that a lobster trap including the guard assembly 20 will allow more lobsters to enter the trap than a similar trap without the guard assembly 20. In addition, it is believed that fewer lobsters will escape a trap equipped with the guard assembly 20 than would escape from a similar trap without the guard assembly 20.

Figure 4:
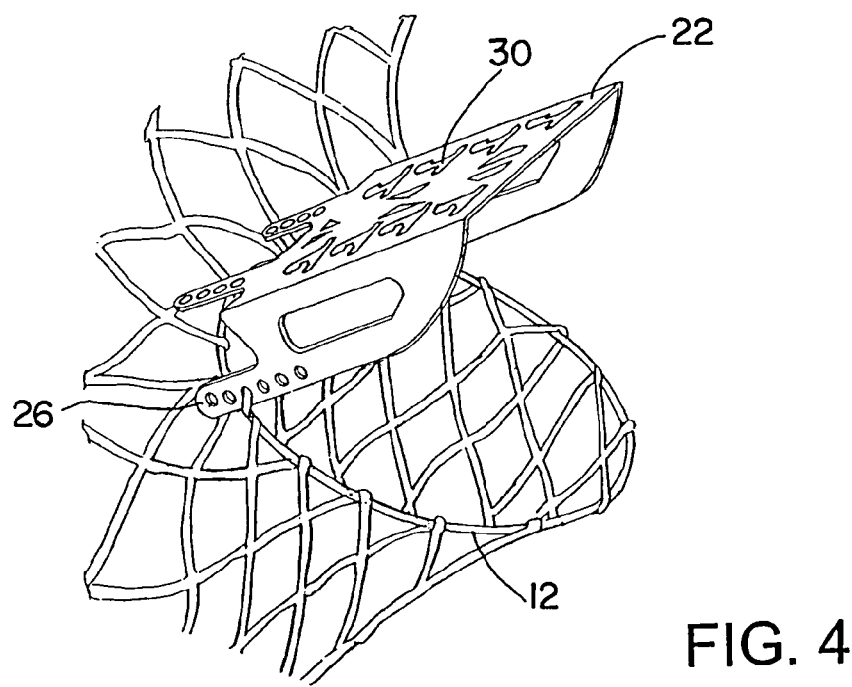
FIG. 4 a perspective view an exemplary lobster trap head including a shield member in accordance with the invention.

As illustrated in FIG. 4, it will be appreciated that the shield member 22 can be used with or without the guard member 24 installed. If the shield member 22 is used without the guard member 24 (e.g., only the shield member 22), the shield member 22 will typically be installed such that it extends from an upper portion of the opening generally away from the opening of the ring 12 so as to function somewhat as a guard (e.g., partially obstruct the opening). In such a configuration, the shield member 22 can be secured to the netting of the trap adjacent the opening of the ring 12 such that the shield member 22, when in a closed position, at least partially obstructs the opening of the ring 12.

It will now be appreciated that the invention as shown and described allows lobster to enter the trap while significantly reducing or eliminating the possibility of the legal lobsters escaping. Accordingly, in a trap equipped with the guard assembly 20 and/or shield member 22 on the heads leading into the kitchen, lobsters will naturally tend to exit the kitchen into the parlor, as desired, due to the additional impediment to exit that the guard assembly 20 and/or shield member 22 present. In theory, once a lobster decides to leave the kitchen it will be less inclined to persist attempting to escape from a head including a guard assembly 20 and/or shield member 22 and, therefore, will exit the kitchen to the head more quickly via the head or heads leading to the parlor. Accordingly, a given lobster may spend less time overall in the kitchen before exiting to the parlor, thereby making entry into the kitchen more desirable to other lobsters approaching the trap.

The guard assemblies and/or shield members 22 as described can be used on heads leading to the kitchen of a trap or leading to the parlor.

It will be appreciated that the invention as described and shown can be installed on existing lobster traps to increase fishing efficiency. Accordingly, lobstermen can retrofit their existing fleet of traps to increase their overall fishing efficiency. In addition, the adjustable features of the invention enable an individual lobsterman to customize the gate assembly to a particular application and/or trap configuration and/or size. In this regard, although shown and described in the context of a lobster trap, it will be appreciated that the invention can be used in a wide variety of traps, including crab traps, for example.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A gate assembly for an opening of a lobster trap comprising:
   a shield member mountable to the lobster trap such that it extends into the interior of the trap away from a plane of the opening and at least partially shields the opening from egress from the interior of the trap while not restricting entry to the interior of the trap, the shield member including a shield portion having at least one opening for allowing water to pass through the shield portion and a mount portion extending rearwardly from a proximal end of the shield portion adjacent the opening of the lobster trap, wherein the mount portion is configured to mount the shield member to the lobster trap; and
   a guard member extending from a distal end of the shield portion and movable between a closed position at least partially obstructing the opening and an open position not obstructing the opening.

2. A gate assembly as set forth in claim 1, wherein the guard member extends from the shield member at a substantially vertical orientation corresponding to the closed position.

3. A gate assembly as set forth in claim 1, wherein the guard member has a plurality of protrusions, and wherein the protrusions are spaced apart for allowing undersized lobsters to escape the trap when the guard is in the closed position.

4. A gate assembly accordingly to claim 3, wherein the guard member includes a central hub portion, and wherein the protrusions extend outwardly from the central hub portion.

5. A gate assembly accordingly to claim 4, wherein at least one of the protrusions is configured to hingedly attached to the shield portion via the at least one opening.

6. A gate assembly as set forth in claim 1, wherein the shield member is mounted to a ring defining an opening in a head of the lobster trap.

7. A gate assembly as set forth in claim 1, wherein the mount portion includes a plurality of openings for mounting the shield to the lobster trap in a plurality of positions.

8. A gate assembly according to claim 1, wherein the shield portion includes a generally planar central portion configured to shield an opening of the lobster trap from at least one direction when mounted thereto.

9. A gate assembly according to claim 8, the shield portion further including at least two downwardly turned edge flap portions extending from respective sides of the central portion.

* * * * *